Patented May 25, 1943

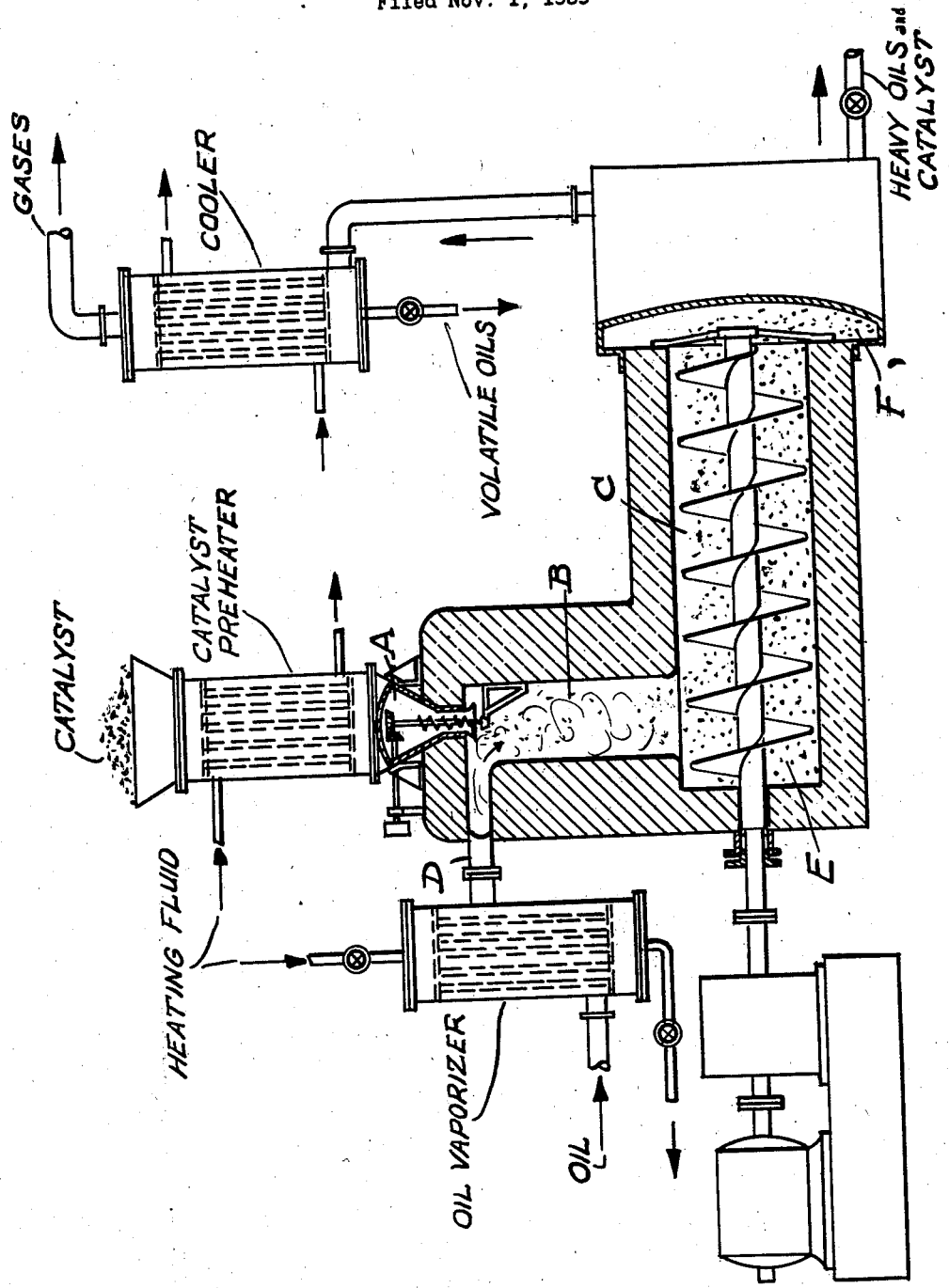

2,319,836

UNITED STATES PATENT OFFICE 2,319,836

PROCESS OF CATALYTICALLY CRACKING HYDROCARBON OILS

Alfred Woerner, Leuna, Germany, assignor to Standard Catalytic Company, a corporation of Delaware Application November 1, 1939, Serial No. 302,293
In Germany November 2, 1938

1 Claim. (Cl. 196—52)

The present invention relates to an improved process of catalytically cracking hydrocarbon oils.

In the vapor phase cracking of hydrocarbon oils in the presence of rigidly arranged catalysts it has been found that those constituents of the oils which are readily cracked frequently undergo cracking in a marked degree immediately upon coming into contact with the catalyst with the result that coke is deposited on the catalyst particles arranged nearest to the place where the oil vapors enter and, besides, an undesirably large amount of gaseous and light boiling liquid hydrocarbons is formed. Continuous working is thus made impossible because the catalyst cannot be renewed without discontinuing the course of operation.

I have now found that hydrocarbon oils can be catalytically cracked in a continuous operation by passing the catalyst along with the vaporous initial oil through the cracking zone in such a manner that contact between both is effected in two stages. To this effect the oil, in the first stage of the operation, is brought into contact for a short period of time with a small proportion of catalyst insufficient to effect substantial cracking, whereas in the second stage the oil is contacted with a large amount of catalyst until the cracking is complete. The volume of the catalyst used in the second stage surpasses the volume of the oil to be cracked present in this part of the cracking apparatus.

The readily decomposable constituents of the oils are thus prevented from being cracked to such an extent that deposits are formed on the catalyst causing a diminution of its efficacy. In the second part of the cracking zone the oil vapors are brought in contact with large amounts of catalyst for further cracking. The readily decomposable constituents having meanwhile been cracked into substances of lesser reactivity, cracking proceeds smoothly also in this part of the apparatus, despite the high ratio of catalyst to oil.

As initial substances I may mention all hydrocarbon oils suitable for cracking in the vapor phase, for example distillates from mineral oils, tars, low temperature carbonization tars, destructive hydrogenation or extraction products of coal, or of hydrogenation products of the said substances, or the products obtainable by the reduction of carbon monoxide with hydrogen.

Suitable catalysts in particular are natural or synthetic silicates, especially those of aluminum or magnesium, for example active earths, which may preferably be incorporated with oxides or sulphides of heavy metals, for example of iron, manganese, chromium or molybdenum.

The process is practiced for example in an apparatus of the type illustrated diagrammatically in section in the accompanying drawing. The said apparatus operates as follows:

Pulverized catalyst is heated to cracking temperature and supplied from container A to the heat insulated part B of the cracking apparatus, said part B having a comparatively narrow cross-section. At the same time the vapors of the initial oil are introduced into chamber B through line D at a speed of for example from 10 to 15 meters a second, thus whirling up the catalyst powder arriving from A. The vapors introduced are preferably mixed with part of the difficultly condensable gases escaping from the cracking apparatus. After a short stay in zone B, for example for a few tenths of a second, the catalyst collects in the enlarged heat insulated cracking zone C through which it is passed by a conveyor worm E, thus being brought into intimate contact with the vapors. The duration of stay of the catalyst in this zone may be regulated by varying the speed of revolution of the conveyor worm E or by arranging the cracking chamber C in an inclined position. From C the oil vapors and the catalyst pass to F where the higher-boiling oil constituents separate along with the catalyst, while the more readily volatile oils and the gases pass on to a cooler. The catalyst, after separation from the heavy oils, may be regenerated and re-supplied to the cracking apparatus.

The following example, given with reference to the aforementioned drawing, serves to illustrate how the present invention may be carried out in practice, but the invention is not restricted to the said example.

Example 5 liters per hour of natural pulverized bleaching earth pretreated with sulphuric acid and heated to a temperature of 455° C. are fed from container A to the cracking space B. At the same time the vapors of 3 liters of East-Texas gas oil (of the following characteristics: boiling point range from 250° to 380° C.; specific gravity 0.855 at 20° C.; aniline point 77.4) are led in through line D likewise preheated at a temperature of 455° C. In part B of the cracking plant the catalyst sojourns for about 0.7 to 1.2 seconds only, but remains for 30 minutes on an average in part C (capacity=3.8 liters).

After a three hours' cracking period, within which 9 liters (7.7 kilograms of oil) have been cracked, the following reaction products are formed:

|  | Kilograms | Percent by weight |
|---|---|---|
| Stabilized benzine | 2.74 | 35.6 |
| Light hydrocarbons obtained in the stabilization | 0.27 | 3.5 |
| Oil boiling from 200° to 370° C | 4.08 | 53.0 |
| Coke | 0.29 | 3.8 |
| Gas | 0.19 | 2.5 |

The stabilized benzine has a specific gravity of 0.741 (at 20° C.), an aniline point of 39, an octane number of 82 and a vapor tension of 0.65 atmosphere at 40° C. The oil boiling from 200° to 370° C. has a specific gravity of 0.868 (at 20° C.) and an analine point of 58.

If the same oil be cracked under equal conditions in a tubular furnace containing 1.8 liters of sulphuric acid treated bleaching earth rigidly arranged therein in the form of pieces, the catalyst must be regenerated for 2 hours with a mixture of nitrogen and air after each cracking period of an hour during which about 1 liter of oil has been treated. After 8 cracking periods, during which 8.7 liters (7.43 kilograms) of oil have been passed through, the following reaction products are formed:

|  | Kilograms | Percent by weight |
|---|---|---|
| Stabilized benzine | 2.31 | 31.1 |
| Light hydrocarbons obtained in the stabilization | 0.45 | 6.1 |
| Oil boiling from 200° to 370° C | 4.0 | 53.9 |
| Coke | 0.31 | 4.2 |
| Gas | 0.25 | 3.4 |

The stabilized benzine has a specific gravity of 0.735 at 20° C., an aniline point of 39.9, an octane number of 83.5 and a vapor tension at 40° C. of 0.65 atmosphere.

What I claim is:

The process of catalytically cracking hydrocarbon oils in the vapor phase, which comprises passing hydrocarbon oils of a boiling range from about 250° C. to about 380° C. in vapor form at about 455° C. into contact with a pulverulent cracking catalyst preheated to about 455° C. in a first zone of operation, maintaining the period of contact of the oil vapor and catalyst in said first zone so short that no substantial cracking occurs, passing the catalyst and the oil vapors thus treated into a second zone of operation, maintaining a volume of catalyst in said second zone which is greater than the volume of hydrocarbon vapors present in said second zone, thereby minimizing the deposition of coke on and diminution in activity of the catalyst.

ALFRED WOERNER.